Sept. 5, 1939. O. QVILLER Re. 21,201

MACHINE FOR REMOVING WATER FROM PULP, CELLULOSE, AND THE LIKE

Original Filed June 26, 1934

O. Qviller
INVENTOR

By: Marks & Clerk
Attys.

Reissued Sept. 5, 1939 Re. 21,201

UNITED STATES PATENT OFFICE 21,201

MACHINE FOR REMOVING WATER FROM PULP, CELLULOSE, AND THE LIKE

Olaf Qviller, Oslo, Norway, assignor to Fibre Making Processes, Inc., Chicago, Ill., a corporation of Illinois Original No. 1,995,011, dated March 19, 1935, Serial No. 732,548, June 26, 1934. Application for reissue December 19, 1938, Serial No. 248,008. In Sweden July 6, 1933

4 Claims. (Cl. 92—43)

Figure 1:
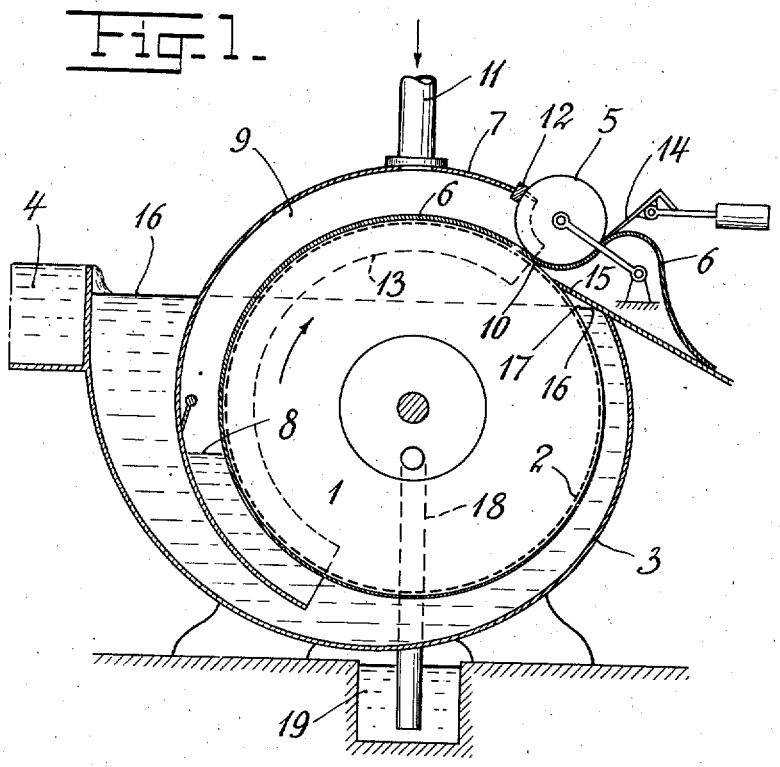

In order to increase the producing capacity of water removing machines (strainer drums) for wood pulp, cellulose and the like pulps, constructions have been devised, wherein some parts of the space below the sieve cloth of the drum is subjected to a reduced pressure. The sieve drum is made with a series of cells under the sieve cloth. During the rotation of the drum these cells are connected successively and automatically with a suction pipe. The connection with the suction pipe is interrupted at the place on the drum, where the pulp layer is removed or cut off, whereupon the connection is reestablished at a suitable place, where the sieve cloth is covered with a pulp layer. Such a cell system shows the drawback that the speed with which the machine can operate is highly limited. In order to remove this drawback partly, it has been proposed to maintain under a suitable reduced pressure the whole space inside the sieve drum by means of a suction box arranged at the point, where the pulp layer is removed from the drum. This construction, however, has shown other inconveniences, because the pulp layer has to be scraped off in a compartment under a lower pressure than that of the atmosphere, and the drawbacks appearing usually just at the point of scraping off the layer.

The present invention makes use of the well-known arrangement, wherein the drum on the upwardly travelling side between the pulp level and the place of scraping off is covered on its outside by a stationary, upstanding cap, hood or the like, and the space between same and the drum circumference is subjected to a pressure which is higher than the atmospheric pressure. According to the invention the space between the drum and the portion of the drum container below the scraping-off point is open to the atmosphere. Further, the increased pressure prevailing in the cap or the like is maintained at so high a value that it presses the pulp level in the container part facing to the down-travelling portion of the drum periphery up to a height located at a short distance under the scraping-off point. A loaded, elastic tightening scraper may be arranged on the cap with its tightening line located at the scraping-off point.

The accompanying drawing shows in vertical cross section two embodiments of the machine.

The sieve drum 1 may be of the same construction as an ordinary drum covered on its periphery with a filtering sieve cloth 2. The drum is immersed partly in a container 3 having a pulp supply 4. A roll 5 presses against the pulp layer 6 to dehydrate same to a suitable degree and to remove it from the drum periphery at the scraping-off point 10. A tight top portion 7 in the form of a cap, hood or the like is arranged above the upwardly travelling portion of the drum periphery between the layer removing roll 5 and the lowermost pulp level 8 inside the container 3 so as to form a closed compartment 9 subjected by means of a suitable air compressor (not shown) to an increased pressure, air being pressed into said compartment through a pipe 11 or the like.

The pressure cap 7 is tightened at 12 against the press roller 5 and likewise against the drum gables by means of side flanges 13, but the cap is open to the bottom side facing to the container bottom, because here the tightening is effected by the pulp contained in the lower part of compartment 9 outside the sieve drum. The space formed between the container 3 and the downwardly travelling drum portion may be in connection with the atmosphere.

The pulp layer 6 lifted out from the drum 2 by the roll 5 or scraped off therefrom at 10 follows with the roll and is removed by a scraper 14 loaded by a weight. Immediately under the point 10 a scraper 15 is arranged to clean the sieve cloth.

The increased pressure in the cap determines the height 16 to which the pulp level is pressed up in the container 3. This level is so adjusted that between the layer removing point 10 and the subjacent longitudinal line 17 of the drum periphery, where the same again enters into the pulp there is a narrow longitudinal periphery portion open to the atmosphere and through which air from inside the drum may escape.

The water passing through the layer and sieve cloth into the drum is removed in ordinary manner by suction pipes 18 and is received in a sump 19.

Figure 2:
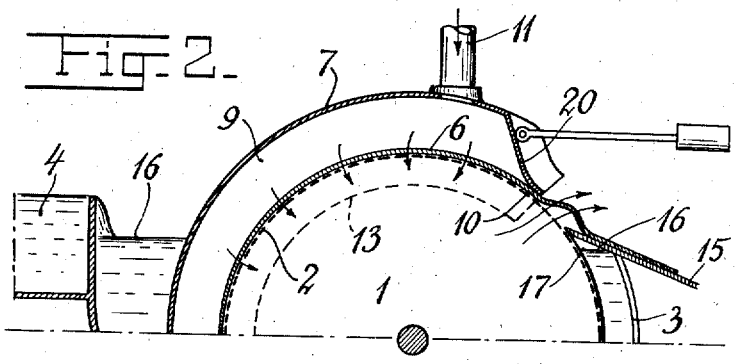

Fig. 2 shows the upper portion of another embodiment, wherein the press roll 5 is dispensed with and replaced by a loaded, elastic sealing member or doctor 20 providing for the tightening between the pressure cap 7 and the layer 6 at its removing point 10.

Another advantage of this arrangement resides in the pressure prevailing in the cap 7 relieving the doctor 20 to prevent the layer from forming longitudinal folds, if the layer increases in thickness in case the pressure inside the compartment 9 increases owing to variations in the air pressure supplied by the compressor or fan.

The foremost closing of the pressure compartment 9 may obviously be located somewhat behind (in the traveling direction of the drum periphery considered) the removing point. Thus according to Fig. 2 this point may be displaced forwards on to the contacting edge of the scraper 15 instead of being located at 16, and this will apply, if the interior drum pressure is not higher than atmosphere pressure. Further, the exterior pressure between the point 10 and the level point 17 need not be so low as atmospheric pressure, provided it is only considerably lower than the pressure prevailing in compartment 9.

I claim:

1. A machine for removing water from wood pulp, cellulose or the like, comprising a container for the pulp, a rotating drum partly immersed in the pulp and provided on its periphery with a sieve cloth, said drum presenting at any time a peripheral portion traveling upwards in the pulp and another peripheral portion traveling downwards in the pulp and also presenting a non-immersed peripheral portion, means for removing the pulp layer from the drum periphery at a point above the pulp level, a stationary cap covering air-tightly the non-immersed peripheral portion of the drum between the pulp level and a point at or behind the layer removing point, and means for subjecting the compartment inside the cap between the latter and the drum to an increased pressure higher than atmospheric pressure, the pressure between the drum and the container below the layer removing point, where the drum periphery enters the pulp, being considerably lower than that prevailing in the cap.

2. A machine for removing water from wood pulp, cellulose or the like, comprising a container for the pulp, a rotating drum partly immersed in the pulp and provided on its periphery with a sieve cloth, said drum presenting at any time a peripheral portion traveling upwards in the pulp and another peripheral portion traveling downwards in the pulp and also presenting a non-immersed peripheral portion, means for removing the pulp layer from the drum periphery at a point above the pulp level, a stationary cap covering air-tightly the non-immersed peripheral portion of the drum between the pulp level and a point at or behind the layer removing point, and means for subjecting the compartment inside the cap between the latter and the drum to an increased pressure higher than atmospheric pressure, the pressure between the drum and the container below the layer removing point, where the drum periphery enters the pulp, being considerably lower than that prevailing in the cap, the means for producing an increased pressure inside the cap being so adjusted as to maintain therein a pressure forcing the pulp level on the downwardly traveling drum periphery up to a height shortly below the layer removing point.

3. A machine according to claim 1, wherein a loaded, elastic sealing member is arranged to contact with the pulp layer on the drum periphery at or behind the layer removing point in such a manner as to seal the cap at this point.

4. A machine according to claim 2, wherein a loaded, elastic sealing member is arranged to contact with the pulp layer on the drum periphery at or behind the layer removing point in such a manner as to seal the cap at this point.

OLAF QVILLER.